Figure 1A:
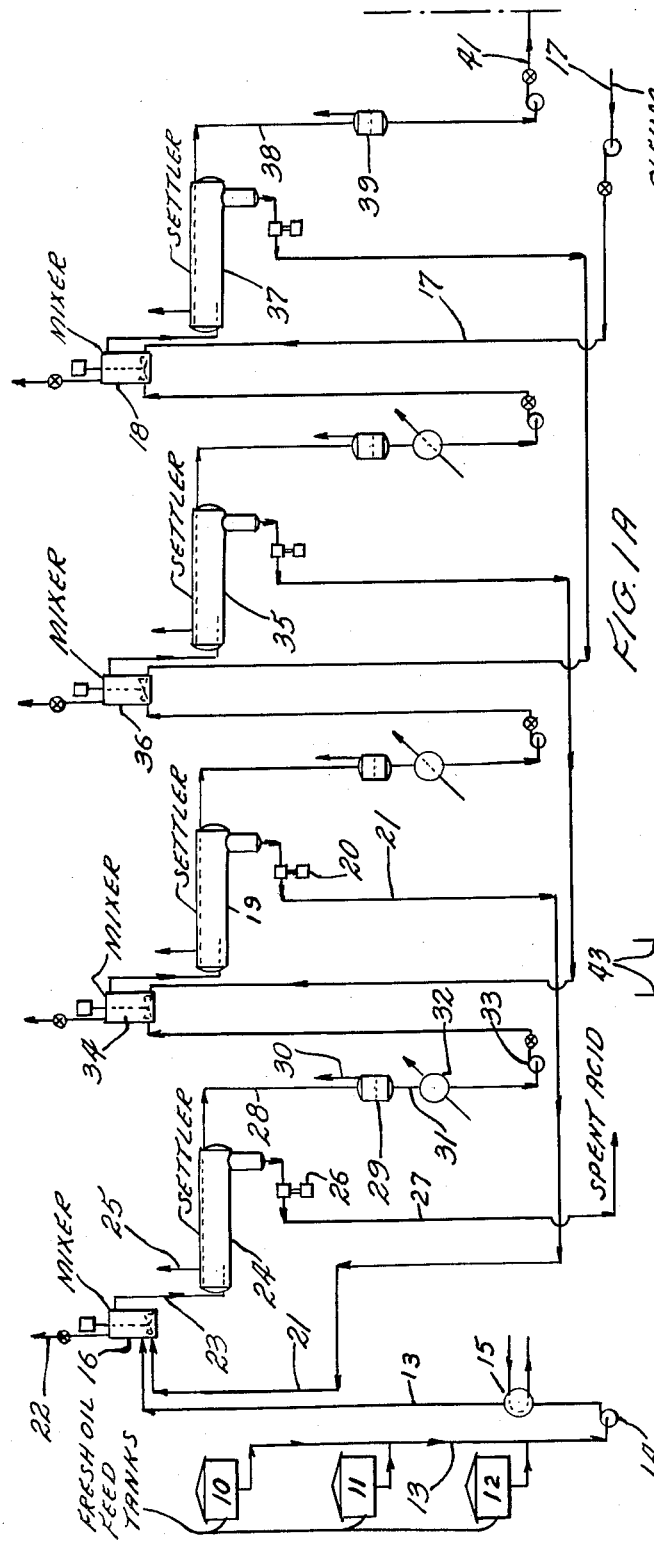

Dec. 6, 1955

E. J. MARTIN 2,726,261

PROCESS FOR PRODUCING CONCENTRATES OF
SULFONIC ACIDS IN PETROLEUM OILS

Filed July 8, 1952

INVENTOR
Edward J. Martin
BY
Adams, Forward and McLean
ATTORNEYS

United States Patent Office 2,726,261
Patented Dec. 6, 1955

2,726,261

PROCESS FOR PRODUCING CONCENTRATES OF SULFONIC ACIDS IN PETROLEUM OILS

Edward J. Martin, Homewood, Ill., assignor to Sinclair Refining Company, New York, N. Y., a corporation of Maine Application July 8, 1952, Serial No. 297,738

1 Claim. (Cl. 260—504)

My invention relates to a process for the production of concentrates of sulfonic acids in petroleum oils by treating petroleum oils with sulfuric acid and in particular relates to a highly effective continuous method of producing these concentrates.

Petroleum oil concentrates of sulfonic acids may be produced by contacting a viscous petroleum stock, such as a lubricating oil fraction or a heavy gas oil, with concentrated sulfuric acid or oleum. This may be done in a batch-wise process and is therefore subject to all the inefficiencies common to this method. Continuous production of these concentrates, known as acid oils, is highly desirable but has been considered difficult and not commercially feasible. One of the major problems in the continuous production of acid petroleum oils which may be used to produce petroleum sulfonates is satisfying the requirement that the acid oil be sludge-free when used for conversion to sulfonates. If not sludge-free, the conversion of the acid oil to sulfonates is very inefficient.

I have devised a continuous method of producing petroleum oil concentrates of sulfonic acids of high quality and concentration, that are substantially sludge-free, in a manner that effects substantial cost savings in terms of operational costs. The process of my invention comprises contacting a petroleum stock and oleum in a continuous counter-current flow system of at least three stages of mixing and settling zones at a temperature of about 100° to 150° F. and separating the reaction products by settling at a temperature of about 120° to 140° F. and for a minimum of about two to six hours to recover a petroleum oil concentrate of sulfonic acids of high quality and concentration.

I have surprisingly found that the quality of the acid oil concentrate produced is proportional to the number of stages of mixing and settling employed in my continuous countercurrent process and that a system of at least three stages is required to produce concentrates of high quality. I have also found that countercurrent acid contacting is more efficient than incremental acid addition to each mixing zone.

According to the process of my invention, I introduce a petroleum oil into the first mixing zone of a series of at least three stages of mixing and settling zones and fuming sulfuric acid or oleum into the last mixing zone. I then contact the oil in the first mixing zone with spent acid (sludge) from the bottom of the settling zone of the succeeding stage for a period of about one to ten minutes and at a temperature of about 100° to 150° F. The mixture is removed and settled in the first settling zone at a temperature of about 120° to 140° F. for a period of about two to six hours. Spent acid (sludge) is removed from the system from the bottom of the first settling zone. A substantially sludge-free acid oil is removed from the top of the first settling zone and is progressed through the system being contacted in each succeeding mixing zone with sludge from the next succeeding settling zone. In the last mixing zone, the acid oil from the preceding settling zone is contacted with fresh oleum and this mixture is settled in the last settling zone. Sludge is returned to the preceding mixing zone and a high quality concentrate of sulfonic acids in petroleum oils is continuously removed from the top of the last settling zone. This concentrate is treated in a vacuum to remove sulfur dioxide and subjected to additional settling and filtering to remove the last traces of sludge.

The continuous process of my invention provides a more efficient manner of producing high yields, e. g. 84 per cent and higher, of petroleum oil concentrates of sulfonic acids than a batch-wise process with resulting savings in operational costs. Moreover, a substantially sludge-free concentrate of high quality and of high sulfonic acids concentration is produced which is very desirable in the production of various sulfonates from the acid oil concentrate.

The petroleum oil useful in the process of my invention is a waxy or dewaxed viscous petroleum stock, advantageously a lubricating oil fraction such as a neutral oil. The viscosity of the oil should not be so high as to interfere with settling. For example, oils of a viscosity from about 100 to 300 S. S. U. at 100° F. are particularly satisfactory. However, oils ranging from heavy gas oils to bright stocks in general are useful. The acid is employed as fuming sulfuric acid or oleum. The oleum may contain from 20 to 40 per cent excess sulfur trioxide and a concentration of about 25 per cent is preferred. Although a 40 per cent concentration is more efficient in respect to product yield, it has a higher melting point than the 22 per cent concentration which presents a handling problem in that it is essentially solid at about 80° F.

I have found that the temperature range required for efficient reaction is between 100° to 150° F. If the temperature is below 100° F., the acid oil becomes too viscous for continuous flow and if above 150° F. undesirable conditions arise such as gas formation, poor color and the occurrence of more water-soluble sulfonic acids. The temperature is controlled by heat exchange and insulation to offset the temperature rise due to the reaction and to prevent undue temperature drops.

The amount of acid used varies with the aromaticity of the oil feed. The more aromatic the oil, the more acid required and the more sludge produced. Dosages of 50 to 150 pounds of acid per barrel of oil may be used. If a raw stock is used the acid dosage may be as high as 200 pounds per barrel of oil. A refined oil requires less acid and produces less sludge, although a too highly refined oil gives a lower potential sulfonate yield.

The mixing of acid and oil should be good but not so intimate as to inhibit settling. I have found that conventional mechanical mixing is adequate. As the reaction is very rapid, the time of mixing is not critical and a period of 1 to 10 minutes is satisfactory.

The reaction products from the mixing zones are settled to remove sludge. I have found that the settling must be carried out at a temperature of about 120° to 140° F. to produce a good quality acid oil and that a minimum of about 2 to 6 hours of settling time is required for good process efficiency. The settling is controlled so that the sludge content of the overhead acid oil is less than 0.5 per cent.

Following removal of the acid oil from the last settling zone, the acid oil is subjected to additional settling and filtering to remove the last traces of sludge, that is, the "pepper sludge" consisting of colloidally dispersed particles of sulfonic acids admixed with sulfuric acid, tar and other materials. First the acid oil is treated in a vacuum to remove sulfur dioxide and then settled in tanks. The acid oil is taken overhead and filtered in rotary filters to remove any remaining sludge.

The process of my invention will be further illustrated by reference to the accompanying drawings of which Figure 1-A is a flow diagram illustrating a continuous countercurrent flow contacting system of four stages, which is an advantageous number of stages for treating some oils, and Figure 1-B is a flow diagram illustrating a process for removal of sulfur dioxide and final sludge from the acid oil produced by the process of Figure 1-A.

Figure 1B:
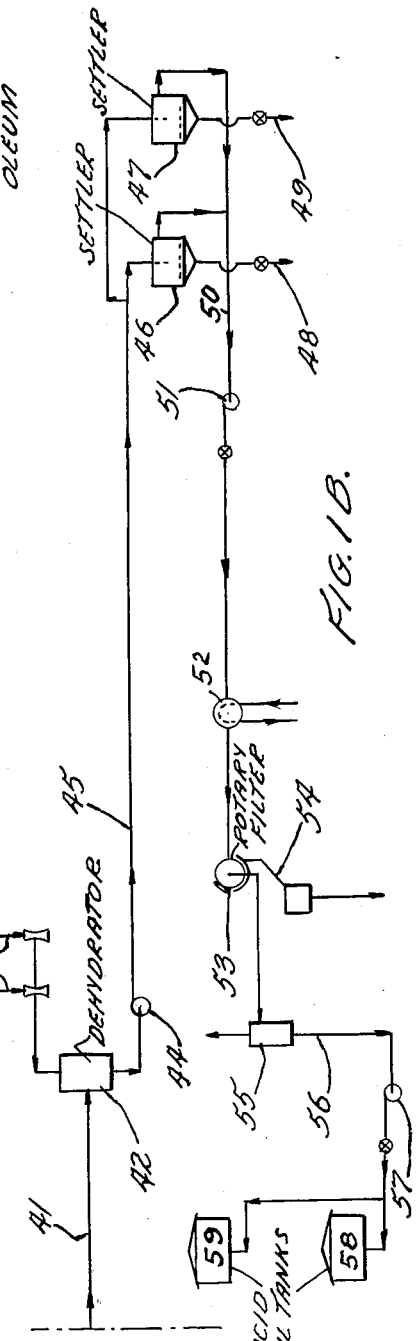

In the operation of Figure 1-A, fresh oil is pumped from tanks 10, 11 and 12 respectively (oil of different viscosities may be stored in these tanks) by line 13 and pump 14 through heater 15 to first stage mixer 16. Fresh oleum of about 22 to 40 per cent excess sulfur trioxide is introduced by line 17 to the fourth stage mixer 18. Spent acid (sludge) is removed from the bottom of the second stage settler 19 and introduced to first stage mixer 16 by pump 20 and line 21. The fresh oil and sludge from the second stage settler are contacted in the first stage mixer 16 by suitable mechanical agitation for a period of one to ten minutes at a temperature of about 100 to 150° F., sulfur dioxide is vented by line 22 and the mixture is removed by line 23 to the first stage settler 24. In the first stage settler 24 the reactants are settled for about 2 to 6 hours at a temperature of about 120 to 140° F. Sulfur dioxide is vented by line 25 and spent acid is removed from the system from the bottom by pump 26 and line 27. Acid oil is removed from the top by line 28 to accumulator 29. Sulfur dioxide is vented from the accumulator 29 by line 30. Acid oil is removed from the accumulator 29 by line 31 to cooler 32 and is pumped by pump 33 to the second stage mixer 34.

In the second stage mixer 34, the acid oil from the first stage settler 24 is contacted with sludge from the bottom of the third stage settler 35. In a manner similar to the operation of the first stage, the mixture is settled in the second stage settler 19 with sludge being sent to the first stage mixer 16 and acid oil to the third stage mixer 36 where it is contacted with sludge from the fourth stage settler 37. Similarly, the mixture from third stage mixer 36 is settled in third stage settler 35 with sludge being sent to the second stage mixer 34 and acid oil to the fourth stage mixer 18. In the fourth stage mixer 18, the acid oil from third stage settler 35 is contacted with fresh oleum introduced by line 17 and the mixture is settled in fourth stage settler 37 with sludge being sent to third stage mixer 36. The acid oil, which is a concentrate rich in sulfonic acids, is removed by line 38 to accumulator 39. The acid oil concentrate is pumped by pump 40 and line 41 to the sulfur dioxide and sludge removal system of Figure 1-B.

In the operation of Figure 1-B, the acid oil concentrate is introduced by line 41 to dehydrator 42. In the dehydrator, sulfur dioxide is removed by a two-stage steam jet ejector 43 and the sulfur dioxide-free acid oil concentrate is removed by pump 44 and line 45 to settler 46 or settler 47 depending upon the viscosity of the stock. Sludge is removed from the bottoms of settlers 46 and 47 by lines 48 and 49 respectively. Substantially sludge-free acid oil concentrate is then removed from settlers 46 and 47 by line 50 and pumped by pump 51 through heater 52 to rotary filter 53. In the rotary filter 53 all traces of "pepper sludge" are removed. More than one rotary filter may be desirable. The sludge from rotary filter 53 is removed by line 54. The filtrate, which is a sludge-free acid oil concentrate of high quality, is removed to receiver 55 and is then pumped through line 56 by pump 57 to acid oil storage tanks 58 and 59.

The process of my invention will be further illustrated by reference to the following experimental examples.

*Example I*

Petroleum oil of the following characteristics was charged to the first mixing zone in a continuous counterflow system of mixing and settling zones ("Countercurrent Unit"):

|  | Type A | Type B |
|---|---|---|
| Gravity (API) | 28.1 | 28.3 |
| K. V./100 (as SSU) | 224.3 | 239.3 |
| K. V./210 (as SSU) | 47.06 | 48.06 |
| Specific Dispersion | 117.3 | 115.5 |

Oleum of a concentration of 25 per cent excess sulfur trioxide was charged to the last mixing zone. Mixing and settling were carried out in a countercurrent flow method as described above. The number of stages varied. The results are tabulated in Table I under test No. 1 to 4 and 7. For comparative purposes, tests were run on this unit to study incremental acid addition. This was carried out by introducing equal quantities of fresh acid to each mixing zone, the spent acid (sludge) being withdrawn from each settling zone ("Incremental Units"). These results are tabulated in Table I under test No. 5 and 6.

The reaction time per stage ranged from 0.115 to 0.205 hours and reaction temperature ranged from 123 to 143° F. The settling time per stage ranged from 0.6 to 3.28 hours and the settling temperature ranged from 114 to 141° F. The tests were carried out in 1.4 gallon settlers and in a 0.25 gallon reaction system.

TABLE I

| Test No. | 1 | 2 | 3 | 4 | 5 | 6 | 7 |
|---|---|---|---|---|---|---|---|
| Acid Dosage (lbs./bbl.) | 81 | 83.2 | 81 | 80 | 113 | 83 | 80 |
| Type feed | A | A | A | A | A | B | B |
| No. Stages | 2 | 3 | 4 | 5 | 5 | 5 | 5 |
| Type Unit [1] | c/c | c/c | c/c | c/c | I | I | c/c |
| Acid Oil Yield [2] | 82.1 | 86.2 | 90.7 | 99.9 | 69.7 | 84.1 | 90.9 |
| Sludge Yield [2] | 167.5 | 150.7 | 134.3 | 67.7 | 207.9 | 159.2 | 135.4 |
| Recovery (Wt. Percent) | 99.1 | 97.5 | 99.0 | 93.4 | 101 | 96.1 | 94.5 |
| Acid No. | 14.2 | 15.27 | 19.5 | 16.3 | 14.8 | 10.0 | 17.3 |
| Sludge in Acid Oil (Vol. Percent) | 1.15 | 0.9 | 0.6 | 1.1 | 1.25 | 3.4 | 1.7 |

[1] c/c=countercurrent. I=incremental.
[2] 100 wt. percent recovery basis. Acid oil based on oil feed. Sludge based on acid feed.

The results of tests 1 to 4 inclusive and 7 show the high yields of acid oil of high acid number and low sludge content obtainable by my countercurrent flow process. The results of the incremental acid addition test as compared to the countercurrent tests show that the countercurrent method is more efficient as indicated by higher acid oil yields of high acid number and lower sludge content.

*Example II*

The acid oil produced by contacting oleum and a petroleum oil by countercurrent flow in a system of stages varying from two to five mixing and settling zones in test No. 1 to 4 inclusive of Example I was then neutralized with barium hydroxide to produce a concentrate of barium sulfonates. The barium sulfonate concentrate contained 2.70 per cent barium for test 1 sample, 3.20 per cent for test 2, 3.71 for test 3 and 3.13 for test 4.

The addition of small amounts of water to lubricating oil blends containing barium sulfonates may cause the oil to become hazy and form precipitates. However, if the sludge is carefully separated from the acid oil in preparing barium sulfonates, the resulting lubricating oil blends show less haziness and precipitate. Thus, a measure of the quality of the barium sulfonate prepared from one sulfonation stock is indicated by a water tolerance test.

In the water tolerance test, the barium sulfonate concentrate was blended with a commercial lubricating oil containing an oxidation inhibitor to give the finished blend a barium content of about 0.4 per cent. To 100 grams of this blend were added 0.1 and 0.3 per cent of water. Each sample, in a pint bottle, was then shaken vigorously for five minutes, poured into a four ounce bottle and allowed to stand for at least ten (10) days.

At the 0.1 per cent added water level, test 4 (five stages) and test 3 (four stages) showed a thin precipitate. Test 2 (three stages) showed a $1/16$ inch precipitate but was only slightly hazy while test 1 (two stages) showed a $1/16$ inch precipitate and was very hazy. At the 0.3 per cent added water level, test 4 (five stages) showed a $1/16$ inch precipitate, test 3 (four stages) showed a $1/8$ inch precipitate, test 2 (three stages) showed a trace of a precipitate while test 1 (two stages) showed a $1/4$ inch precipitate.

The very small amount of precipitate of the three, four and five stage samples as compared to the relatively large precipitate and haziness of the two stage sample demonstrate that the quality of the barium sulfonates produced from the acid oil is proportional to the number of stages employed in the countercurrent sulfonation process an that at least three stages of contacting and settling are required to produce a good quality acid oil useful for conversion to sulfonates.

*Example III*

A well settled commercial acid oil containing 0.4 volume per cent sludge was fed to a rotary filter to test removal of "pepper sludge." The filter was given a $5/8$ inch HyFlo Super Cel Precoat, the acid oil temperature was 105° F., and the drum rotation speed was 10 R. P. M. with a 24 inch vacuum at the filter.

With a $5/8$ inch precoat a filtering rate of 4.1 gallons/hour/square foot of filter surface was obtained. It was found that this rate can be increased by higher temperature operation and by decreasing the precoat thickness. No trace of "pepper sludge" was found in the filtrate.

I claim:

A process for producing concentrates of sulfonic acids in petroleum oils which comprise continuously introducing a petroleum oil into a first mixing zone of a series of at least three stages of mixing and settling zones, continuously introducing oleum into the last mixing zone of the series of mixing and settling zones, contacting the oil in first mixing zone with sludge from the succeeding settling zone at a temperature of about 100° to 150° F., removing an acid oil from the first mixing zone, settling the acid oil in the first settling zone at a temperature of about 120° to 140° F., removing the settled acid oil from the top of the first settling zone, progressively contacting the settled acid oil from the first settling zone in each succeeding mixing zone with sludge from the next succeeding settling zone, contacting the acid oil from the preceding settling zone with the oleum in the last mixing zone, settling the reactants in the last settling zone and continuously removing overhead a concentrate of sulfonic acids in petroleum oils.

References Cited in the file of this patent
UNITED STATES PATENTS

| Number | Name | Date |
|---|---|---|
| 1,705,809 | Davis et al. | Mar. 19, 1929 |
| 1,977,717 | Davis et al. | Oct. 23, 1934 |
| 2,155,367 | Scott | Apr. 18, 1939 |
| 2,189,128 | Breth | Feb. 6, 1940 |
| 2,412,916 | Showalter | Dec. 17, 1946 |
| 2,459,419 | Engel et al. | Jan. 18, 1949 |